A. W. DABY.

Children's Carriage.

No. 6,657. Reissued Sept. 28, 1875.

Witnesses.
Otto Shipland.
Chas. Kahler.

Assignee of
Inventor.
A. W. Daby
by Van Santvoord & Hauff
his Attys

N. PETERS, PHOTO-LITHOGRAPHER, WASHINGTON, D. C.

UNITED STATES PATENT OFFICE.

A. W. DABY, OF BROOKLYN, NEW YORK, ASSIGNEE OF ADELAIDE S. ELDER, EXECUTRIX OF ROSCOE G. ELDER, DECEASED.

IMPROVEMENT IN CHILDREN'S CARRIAGES.

Specification forming part of Letters Patent No. 112,696, dated March 14, 1871; reissue No. 6,657, dated September 28, 1875; application filed May 19, 1875.

*To all whom it may concern:*

Be it known that ROSCOE G. ELDER, formerly of the city, county, and State of New York, (now deceased,) did invent a new and useful Improvement in Children's Carriages, which improvement is fully set forth in the following specification, reference being had to the accompanying drawing, in which—

Figure 1:
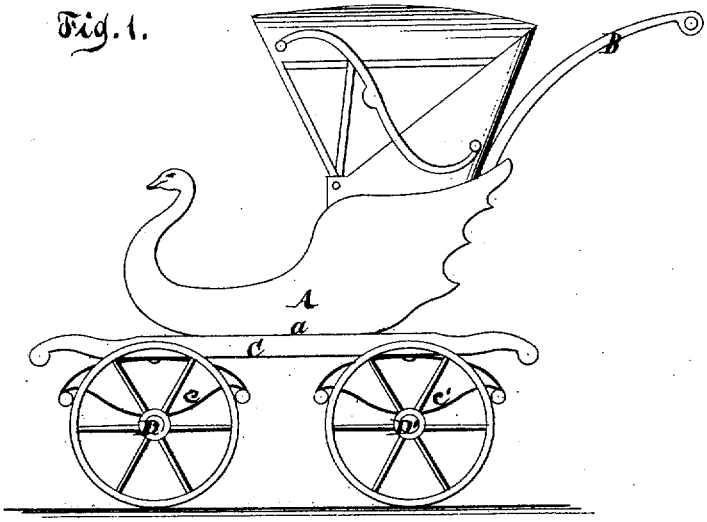
Figure 2:
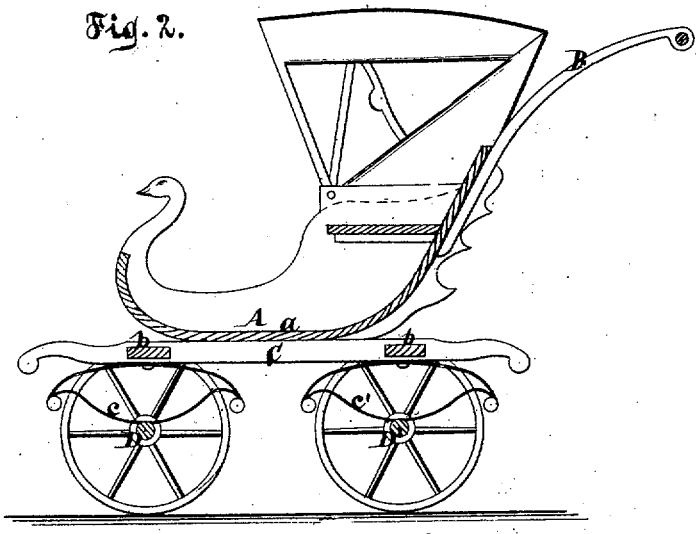
Figure 3:
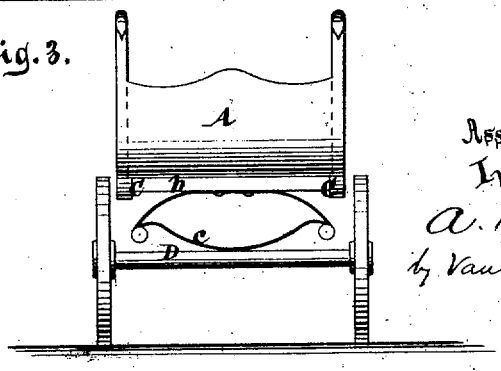

Figure 1 represents a side view of this invention. Fig. 2 is a longitudinal vertical section of the same. Fig. 3 is a front view of a modification of the same.

Similar letters indicate corresponding parts.

This invention relates to certain improvements in children's carriages of that class known as push-carriages or perambulators. These improvements consist in the combination, with the body of a child's push-carriage or perambulator and the front axle thereof, of an independent spring, (one or more,) forming the connection between the front axle and the cross-bar upon which the body-supporting stays rest, whereby the construction of the carriage is facilitated, and a perambulator is obtained which is light and graceful, and the motion of which is free and easy. The body-supporting stays or sills are level and fitted to a flat portion of the bottom of the body, so as to save the labor of hollowing out the upper surfaces of the sills, and to make room for springs running below the sills and arranged transversely to or parallel with the axles, said springs forming the sole connection between the axles and the sills, while the sills or body-supporting stays are connected by cross-bars.

In the drawing, the letter A designates the box or body of my carriage, which is provided with a push-handle, B, and which may be ornamented by heads of swans or other objects. With this body are combined supporting stays or sills C, which are connected by cross-bars *b*, and beneath said body-supporting stays are situated springs *c c'*, which form the sole connection between the body A and the axles D D'. Said springs may either be placed transversely to the axles, as shown in Figs. 1 and 2 of the drawing, or they may be placed parallel to said axles, as shown in Fig. 3; or the rear spring *c'* may be transverse, and the front spring *c* parallel, to their axles. When the spring *c* is placed parallel to the axle D it is connected at its lower part to the axle D, and its upper part is fastened to the cross-bar *b*, which is secured to the body-supporting stays C C. When the body-supporting stays or sills C are arranged as shown in Figs. 1 and 2, the body A is constructed with a flat part, *a*, so that the same can be firmly secured to the sills, the upper surface of which is flat, and by these means the labor ordinarily required for hollowing out the upper surface of the sills is saved, and the full strength of the sills is preserved. Furthermore, said sills are made of straight pieces of wood, thus saving the labor and expense required to bend them.

By these means a perambulator is obtained the wheels of which are free to adapt themselves to the formation of the ground, and the weight of the occupant of the carriage can have no disturbing influence on the correct position of the wheels, while at the same time the push-handle is firmly connected to the body of the carriage, and a push-carriage is obtained which is strong and durable, which is not liable to upset, and which can be constructed at a comparatively low cost.

What I claim as new, and desire to secure by Letters Patent, is—

1. The combination, with the body of a child's push-carriage or perambulator, its front axle, and the cross-bar upon which the body-supporting stays or sills rest, of one or more springs, forming the connection between said front axle and cross-bar, substantially as set forth.

2. The combination, in a perambulator, of a body having a flat or partially flat bottom with straight sills, springs below the sills, and cross-bars connecting said sills in front and rear, all constructed and operating substantially as shown and described.

In testimony that I claim the foregoing I have hereunto set my hand and seal this 15th day of May, 1875.

A. W. DABY. [L. S.]

Witnesses:
W. HAUFF,
JNO. D. PATTEN.